United States Patent
Benisty et al.

(10) Patent No.: US 10,534,546 B2
(45) Date of Patent: Jan. 14, 2020

(54) STORAGE SYSTEM HAVING AN ADAPTIVE WORKLOAD-BASED COMMAND PROCESSING CLOCK

(71) Applicant: Western Digital Technologies, Inc., Irvine, CA (US)

(72) Inventors: Shay Benisty, Beer-Shava (IL); Tal Sharifie, Lehavim (IL)

(73) Assignee: Western Digital Technologies, Inc., San Jose, CA (US)

( * ) Notice: Subject to any disclaimer, the term of this patent is extended or adjusted under 35 U.S.C. 154(b) by 44 days.

(21) Appl. No.: 15/621,480

(22) Filed: Jun. 13, 2017

(65) Prior Publication Data
US 2018/0356996 A1    Dec. 13, 2018

(51) Int. Cl.
*G06F 3/06* (2006.01)
*G06F 13/16* (2006.01)
*G06F 12/02* (2006.01)
*G06F 1/08* (2006.01)
*G06F 1/324* (2019.01)

(52) U.S. Cl.
CPC ............ *G06F 3/0613* (2013.01); *G06F 1/324* (2013.01); *G06F 3/061* (2013.01); *G06F 3/0625* (2013.01); *G06F 3/0653* (2013.01); *G06F 3/0679* (2013.01); *G06F 12/0246* (2013.01); *G06F 13/1668* (2013.01); *G06F 3/0659* (2013.01); *G06F 2212/1016* (2013.01); *G06F 2212/7211* (2013.01)

(58) Field of Classification Search
CPC ........... G06F 12/02; G06F 12/26; G06F 15/76
See application file for complete search history.

(56) References Cited

U.S. PATENT DOCUMENTS

| | | | | |
|---|---|---|---|---|
| 2004/0143710 A1* | 7/2004 | Walmsley | ............ | B41J 2/04505 711/144 |
| 2004/0193397 A1* | 9/2004 | Lumb | .................. | G06F 13/105 703/24 |
| 2012/0047317 A1* | 2/2012 | Yoon | ..................... | G06F 3/0613 711/103 |
| 2012/0047318 A1* | 2/2012 | Yoon | ..................... | G06F 3/0613 711/103 |
| 2012/0179846 A1* | 7/2012 | Haustein | ................. | G06F 3/061 710/38 |
| 2013/0159607 A1* | 6/2013 | Kyung | .................. | G11C 16/10 711/103 |
| 2015/0198967 A1* | 7/2015 | Wang | ..................... | G06F 1/324 713/322 |
| 2017/0242607 A1* | 8/2017 | Vishne | ................. | G06F 3/0625 |

* cited by examiner

*Primary Examiner* — Getente A Yimer
(74) *Attorney, Agent, or Firm* — Morgan, Lewis & Bockius LLP

(57) ABSTRACT

A storage system having an adaptive workload-based command processing clock is provided. In one embodiment, a storage system has a memory, a command processing path, and a controller in communication with the memory and the command processing path. The controller is configured to adapt an input clock signal based on a current workload of the controller and provide the adapted clock signal to the command processing path in the controller.

18 Claims, 7 Drawing Sheets

STORAGE SYSTEM HAVING AN ADAPTIVE WORKLOAD-BASED COMMAND PROCESSING CLOCK

BACKGROUND

Some storage systems have performance requirements for random and sequential operations. Random operation performance is sometimes defined in input-output operations per second (IOPS), which define the number of random commands the storage system can execute in one second. This number also determines the maximum time of each pipeline stage in the command processing path. The storage system can use a high-frequency clock in order to achieve its performance requirement. In some storage systems, this clock is gated off when there are no pending commands.

DETAILED DESCRIPTION

Overview

Figure 1A:
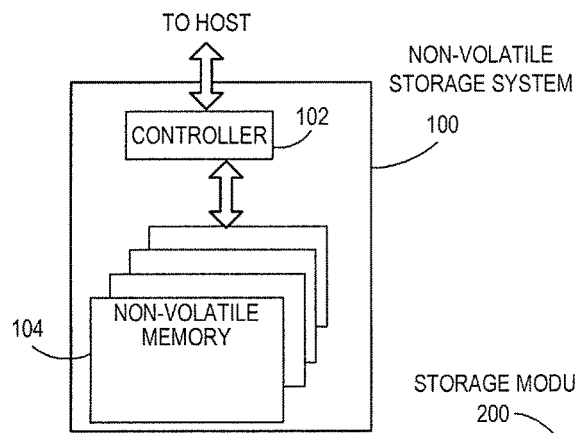
FIG. 1A is a block diagram of a non-volatile storage system of an embodiment.

By way of introduction, the below embodiments relate to a storage system having an adaptive workload-based command processing clock. In one embodiment, a storage system is provided comprising a memory; a command processing path; and a controller in communication with the memory and the command processing path. The controller is configured to adapt an input clock signal based on a current workload of the controller; and provide the adapted clock signal to the command processing path in the controller.

In some embodiments, the controller comprises a workload monitor counter; an outstanding command counter; and at least one divider configured to adapt the input clock signal by dividing the input clock signal by a quotient of a value of the workload monitor counter divided by a value of the workload monitor counter.

In some embodiments, the command processing path comprises one or more of the following: a command parser, a command executor, and a front-end processor.

In some embodiments, the memory comprises a three-dimensional memory.

In some embodiments, the storage system is embedded in a host.

In some embodiments, the storage system is removably connected to a host.

In another embodiment, a method for using a storage system with an adaptive clock is provided. The method comprises calculating an average workload per command; modifying a clock signal based on the calculated average workload per command; and providing the modified clock signal to at least one component in the controller.

In some embodiments, the average workload per command is calculated using a first counter that tracks data transfer sizes of pending command, a second counter that tracks a number of pending commands, and a divider that divides a value of the first counter by a value of the second counter.

In some embodiments, the clock signal is modified by dividing the clock signal by the average workload per command.

In some embodiments, the at least one component comprises one or more of the following: a command parser, a command executor, and a front-end processor.

In some embodiments, the memory comprises a three-dimensional memory.

In some embodiments, the storage system is embedded in a host.

In some embodiments, the storage system is removably connected to a host.

In some embodiments, the clock signal is modified using a workload-based clock generator in the controller.

In some embodiments, the at least one component in the controller comprises a command processing component.

In some embodiments, the storage system comprises a solid state drive, such as, for example, an enterprise solid state drive.

In another embodiment, a storage system is provided comprising a memory; and means for generating a variable clock signal based on a number of commands and a data transfer size associated with the commands and for providing the variable clock signal to a command processing component.

In some embodiments, the means comprises at least one counter and at least one divider.

In some embodiments, the means is implemented in a controller of the storage system.

In some embodiments, the command processing component comprises one or more of the following: a command parser, a command executor, and a front-end processor.

In some embodiments, the memory comprises a three-dimensional memory.

In some embodiments, the storage system is embedded in a host.

In some embodiments, the storage system is removably connected to a host.

Other embodiments are possible, and each of the embodiments can be used alone or together in combination. Accordingly, various embodiments will now be described with reference to the attached drawings.

Embodiments

Figure 1B:
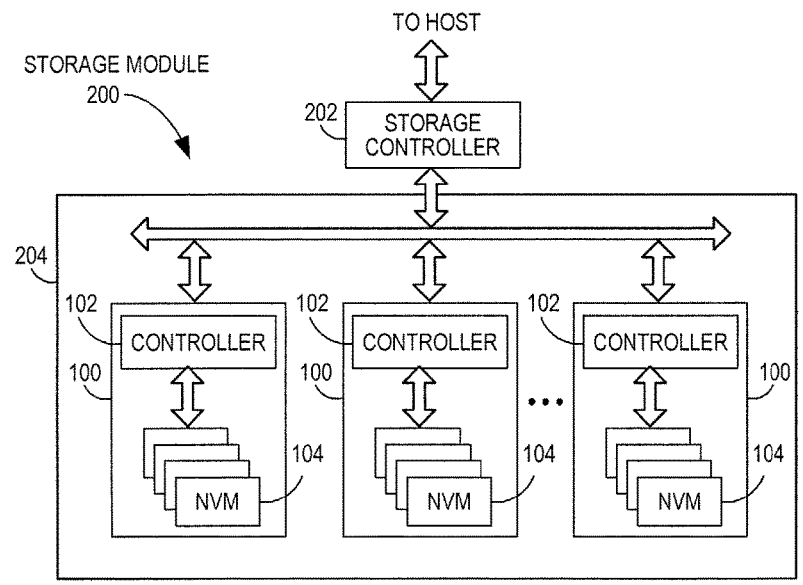
FIG. 1B is a block diagram illustrating a storage module of an embodiment.
Figure 1C:
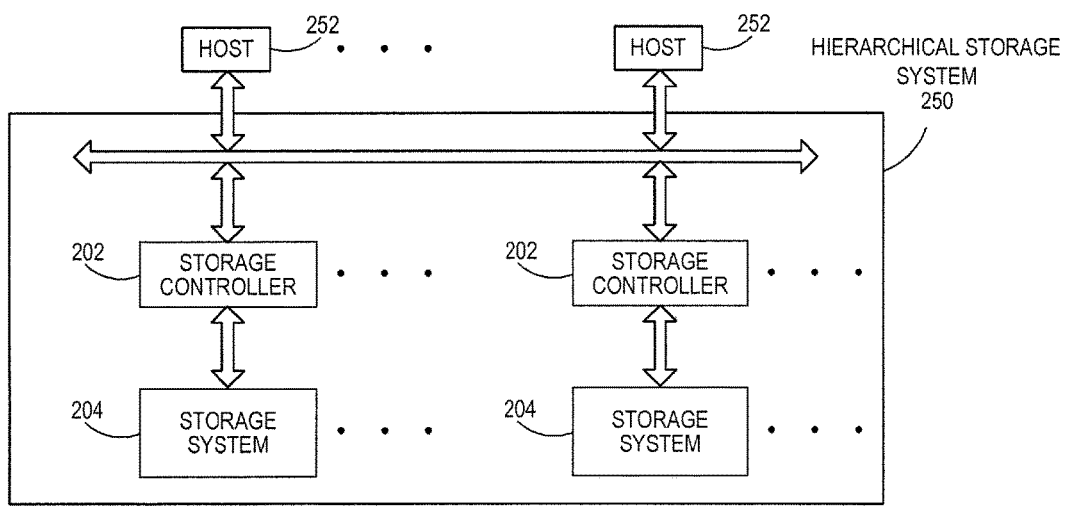
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are forming on a single semiconductor substrate. Controller 102 interfaces with a host system and transmits command sequences for read, program, and erase operations to non-volatile memory die 104.

The controller 102 (which may be a non-volatile memory controller (e.g., a flash, Re-RAM, PCM, or MRAM controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interface express (PCIe) interface, or dual-date-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
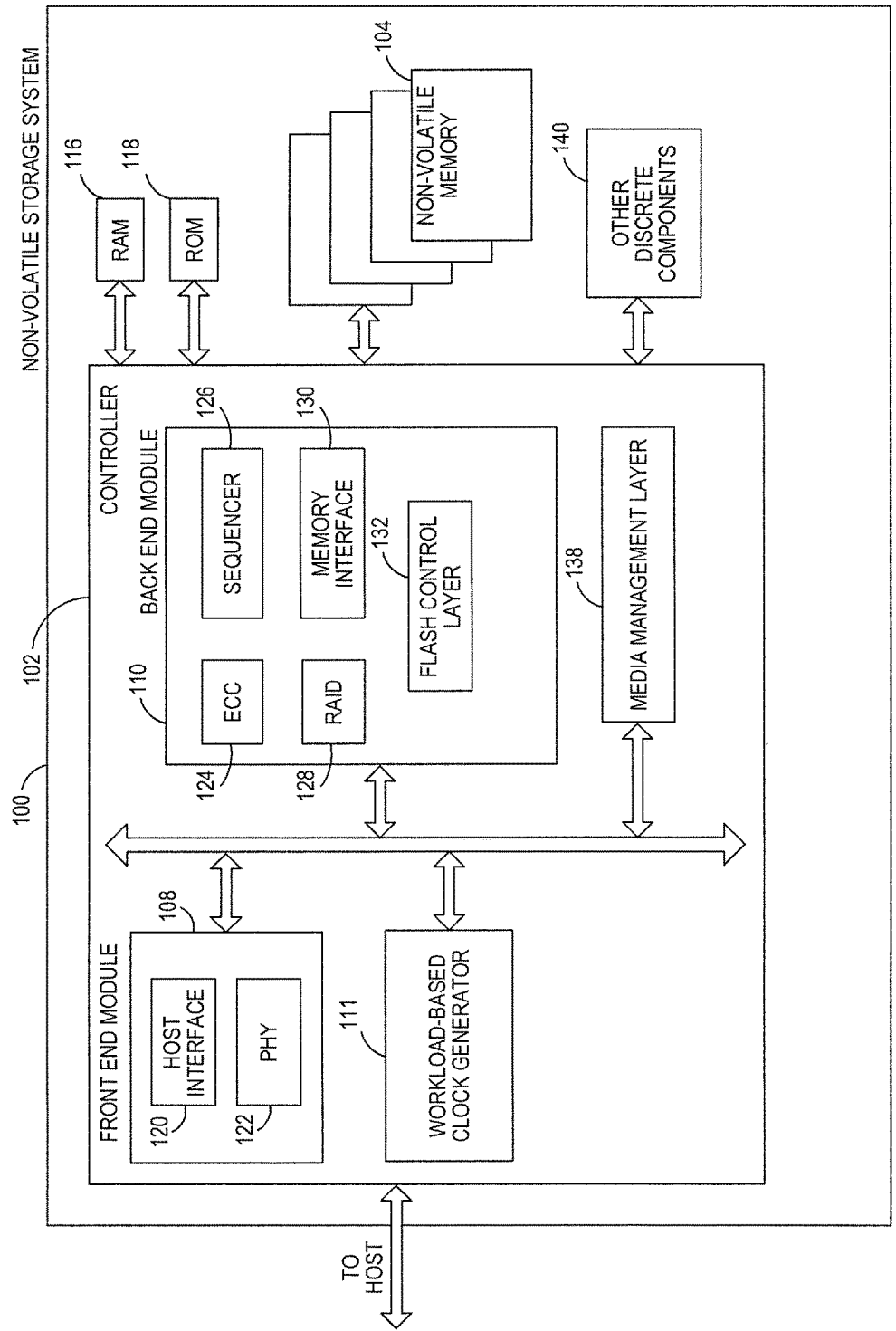
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a workload-based clock generator 111, which is discussed in more detail below, and can be implemented in hardware or software/firmware. The workload-based clock generator 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
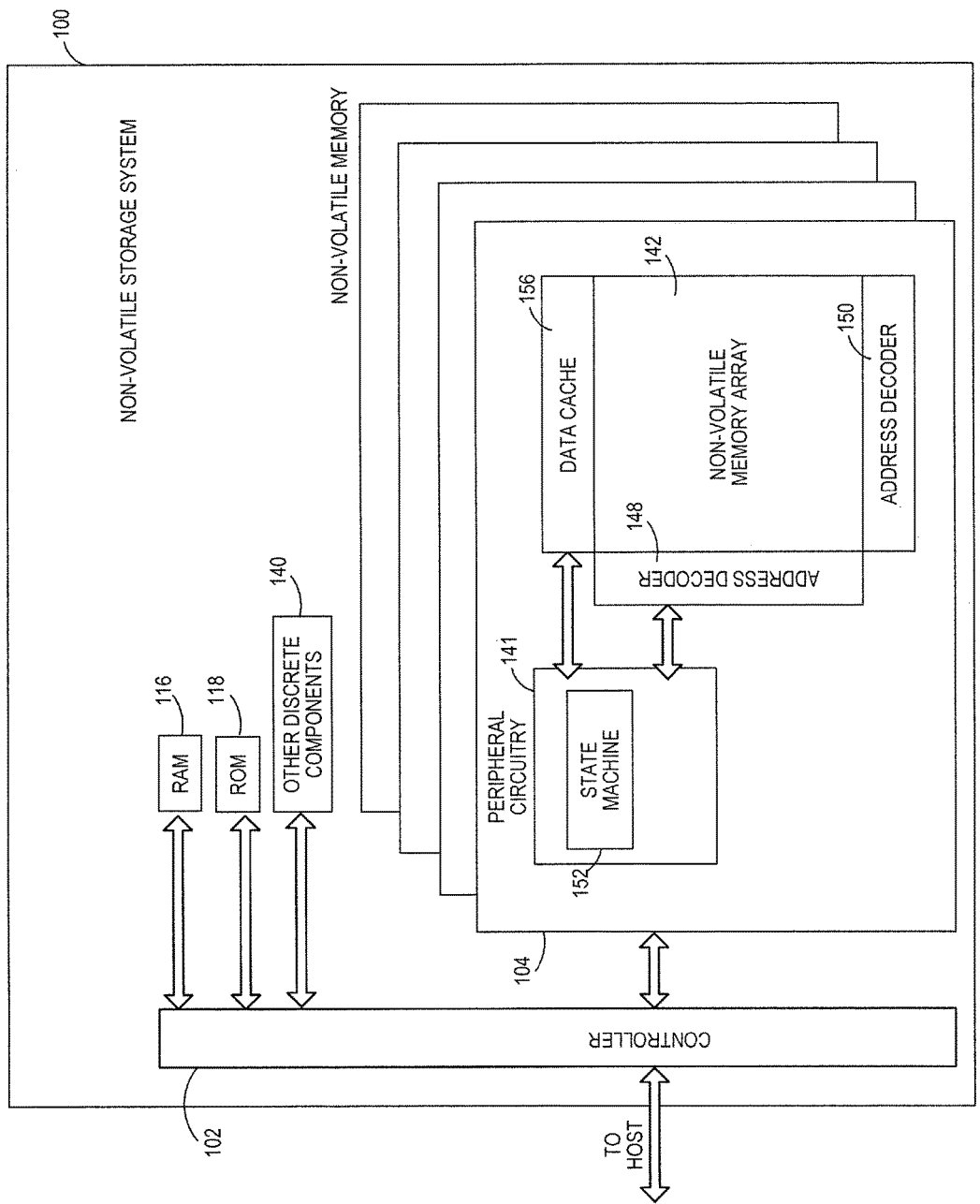
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Figure 3:
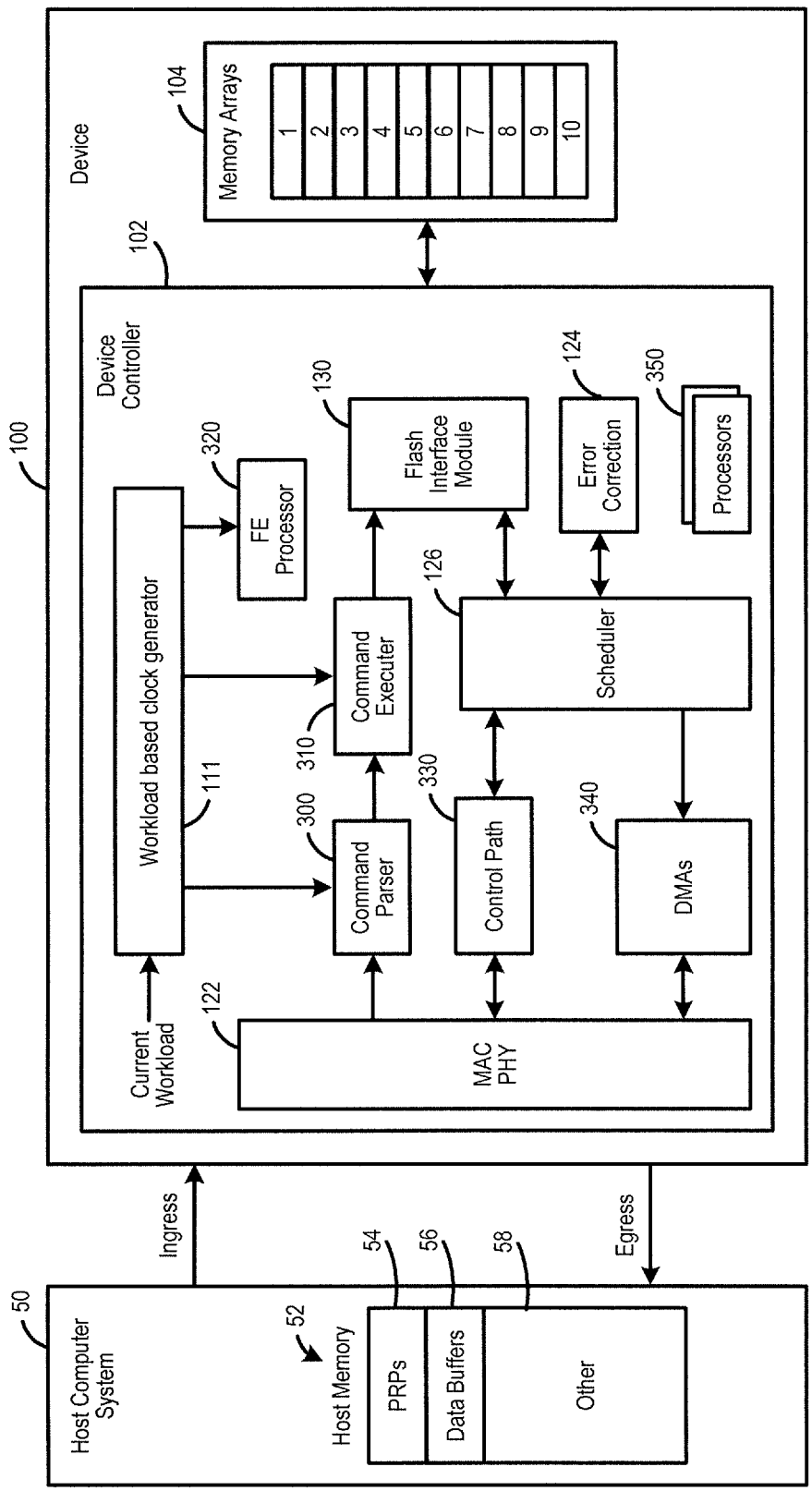
FIG. 3 is a block diagram illustrating a host and storage system of an embodiment.

FIG. 3 is an illustration of one particular implementation of a host computing system (or "host") 50 and storage system 100 of an embodiment. It should be noted that this is just an example, and other implementations can be used. For example, while FIG. 3 shows some components that are similar to those shown in FIG. 2A and also shows some additional components, other implementations of the controller 102 can be used.

As shown in FIG. 3, in this embodiment, the host 50 comprises a host memory 52, which can have a Physical Region Page (PRP) partition 54 for storing PRP entries when using the NVMe protocol, a data buffer partition 56, and other partitions 58 for storing other data, such as data read from or to be written to the storage system 100. The host 50 can take any suitable form, such as, but not limited to, a personal computer, a mainframe computer, a server, or other computing device.

The host 50 communicates with the storage system 100 using ingress and egress buses. Although shown diagrammatically as two arrows in FIG. 3, these two communication paths can be a part of the same bus. The ingress and egress buses communicate between a storage system interface (not shown) in the host 50 and the MAC PHY 122 in the controller 102 of the storage system 100. "PHY" is an abbreviation for the physical layer and refers to the circuitry used to implement physical layer functions. The PHY can connect a link layer device called a MAC (media access control) to a physical medium, such as a wire, cable, or fiber. There are many protocols defined in the industry for this interface, such as, but not limited to, Peripheral Component Interconnect Express (PCIe), SATA, and NVMe. The MAC and PHY 122 can implement three low protocol layers (Transaction layer, Data Link layer, and Physical layer).

While the MAC PHY 122 is the interface between the controller 102 and the host 50, the flash interface module 130 is the interface between the controller 102 and the memory arrays 104. In general, the flash interface module (FIM) 130 is responsible for low-level interaction with the memory arrays 104. While flash is used in this example, it should be noted that other memory technologies can be used, which is why FIG. 2A refers to a "memory interface" 130 instead of the more specific "flash interface module."

As shown in FIG. 3, there are several components between the MAC PHY 122 and the flash interface module 130. In this embodiment, those components include a command parser 300, a command executer 310, a front end processor 320, a control path 330, direct memory access modules (DMAs) 340, additional processors 350, an error correction module 124, and a scheduler/sequencer 126. Again, this is just an example implementation, and other implementations can be used. Component(s) in the controller 102 can form a command processing path. As used herein, a "command processing path" can refer to one or more components in the controller 102 that are used to process a command, and a pipeline stage can refer to one of these components. For example, in this embodiment, the command processing path includes the following pipeline stages: the command parser 300, the command executer 310, and the front end processor 320. Of course, this is just an example, and other implementations can be used.

The command parser 300 is responsible for fetching and parsing the commands from the host 50 and internally queuing them. For example, the command parser 300 can receive a command, parses it, and check the correctness of the command. The command parser 300 can also be responsible for controlling the flow of data between the controller 102 and the memory arrays 104 by ordering requests or commands in a queue. The order may be based on priority of the request, availability of resources to handle the request, an address needed for the request, the age of the request, or access history of the requestor. In this way, the queue can be used to enable the delay of command execution, either in order of priority, on a first-in first-out basis, or in any other order. Instead of waiting for each command to be executed before sending the next one, the command parser 300 can just put the commands in the queue and can perform other processes while the queue is executed. In operation, the command parser 300 gets commands from the host 50, makes sure the command is ok, and can classify the command as a read or write command. The command parser 300 can also determine whether the command should be executed by the command executor 310 or by the front-end processor 320. The command executor 310 is a hardware component in this embodiment and is used as a hardware accelerator for certain commands (e.g., user reads and writes to the memory arrays 104). However, other commands (e.g., administrative commands) may not be suitable for hardware acceleration and are sent instead to the front-end processor 320 for execution.

If a command is sent to the command executor 310 for execution, the command executor 310 can first arbitrate between all the commands in the queue and select one for execution based on priority. Then, the command executor 310 can detect the commands and implement address translation of the logical block address (LBA) in the command to a physical address in the memory arrays 104. The command executor 310 can also provide stream detection (e.g., whether the host 50 is sending sequential LBAs). If the command executor 310 detects a read stream from the host, the command executor 310 can pre-fetch data from the memory arrays 104 that the command executor 310 thinks the host 50 may want next. Caching data in the controller 102 in this way can increase performance. The command executor 310 can also have a collision table. In operation, the command executor 310 can use the table (or other data structure) to write the address range of a command (e.g., LBA and size). If the host 50 is trying to send a write command immediately after the read command, the command executor 310 can make sure that the read command will get new data. The command executor 310 can also activate backend hardware, such as the error correction engine 124 and the flash interface module 130.

If the command is not a read/write command but instead is an administrative or low-level command that is not suitable for hardware acceleration (e.g., when the host 50 is trying to get status information (e.g., a command to get a log page or error attributes) or configure the storage system 100 (e.g., a set feature or get feature command)), the command can be sent to the front-end processor 320 for execution. The front end processor 320 can also be responsible for handling exception scenarios, even for read/write commands. For example, if the command executor 310 detects a collision in a read command, the read command can be directed to the front-end processor 320 for handling. In other embodiments, address translation, stream detection, and other functionality can be executed by the front-end processor 320 instead of the command executor 310.

The scheduler 126 is responsible for scheduling data transfers and control paths. For example, read data might arrive from different memory arrays in parallel. The scheduler 126 can arbitrate between them and activate the DMAs 340, which are responsible for the data transfer between the host 50 and memory arrays 104. The error correction module 124 is responsible for error detection and correction and can decode and encode data read from and written to the memory arrays 104. The processors 350 are responsible for executing back-end tasks, and the control path 330 is responsible for the overall control of the controller 102.

As mentioned above, a storage system (e.g., a solid state drive in a client or enterprise environment) may be defined by random and sequential performance requirements, which tend to increase over time. For example, random performance is usually defined in input/output operations per second (TOPS), which define the number of 4 KB (random) commands the storage system executes in one second. This number can also determine the maximum time of each pipeline stage in the command processing path. For instance, when the requirement is to support random performance of 650K IOPS, each pipeline stage in the command processing path should not exceed 1.5 microsecond, which is based on the worst-case scenario when getting only random (4 KB) commands.

The following table summarizes random performance requirements and command processing rates, which are a function of the required performance, of some example client and enterprise solid state drives (SSDs).

|  | Random Read Performance | Command Processing Rate | Clock Frequency |
| --- | --- | --- | --- |
| Client SSD 1 | 450KIOPS | 2.2 uSec | 500 MHz |
| Client SSD 2 | 650KIOPS | 1.5 uSec | 650 MHz |
| Enterprise SSD | 1.5MIOPS | 0.6 uSec | >700 MHz |

As can be seen by this table, very high performance requirements require the device pipeline stages to be very fast, especially in enterprise SSDs. The table also presents the frequency of the command processing path clock. The clock frequency of this path is very high compared to the data-path clock, which can be in the order of 300 MHz.

The command processing path in the storage system can include several pipeline stages (e.g., lookup operations on predefined tables, such as flash translation level (FTL) tables for address translation, and collision detection tables (e.g., cached entries and overlap)). It can also include other functionality, such as stream detection and command parsing. These pipeline stages can be designed to support the required performance, such as by using parallelism and other architecture techniques that can lead to an increase in area. More specifically, each pipeline stage can require a lot of hardware cycles, but the performance requirement defines an upper limit to the number of available hardware cycles. Some of the pipeline stages can include lookup operations in large databases, which require accessing memory. In order to support this, more parallelism can be added in the hardware (e.g., having a dual port RAM rather than a single port RAM), and more hardware functions can be defined to replace firmware code in order to have better performance. In addition, increasing the frequency of the clock that the processing path works with can help meet the performance requirements. However, a high-frequency clock is a major power consumer path. When there are no pending commands, the clock might be gated off to conserve power, but when there is any activity, the path gets the full performance while having a fixed clock (i.e., the clock frequency of the command path is static).

Figure 4:
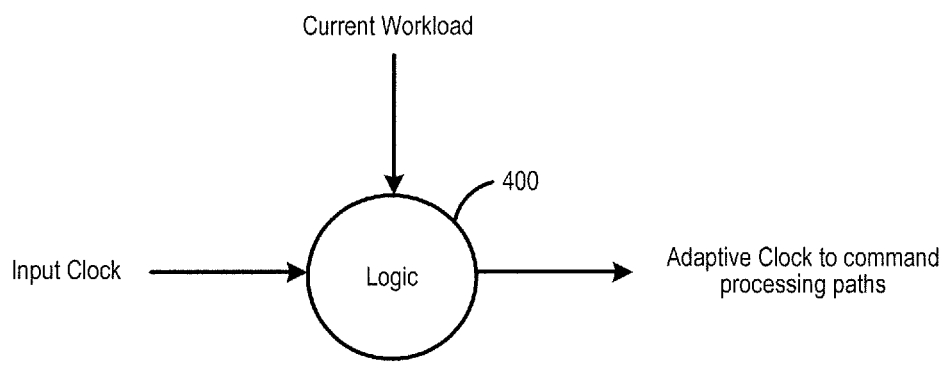
FIG. 4 is a diagram illustrating the generation of an adaptive clock of an embodiment.

The following embodiments provide a way of dealing with the high performance requirements and the power consumption trade off in the command processing path. In general, in these embodiments, the workload-based clock generator 111 generates an adaptive clock (instead of a static clock) for use by the various internal pipeline stages in the controller 102. As shown diagrammatically in FIG. 4, logic 400 in the workload-based clock generator 111 takes a static input clock and information about the current workload of the controller 102 and outputs an adaptive clock to be sent to one or more component in the command processing paths of the controller 102 (e.g., the command parser 300, the command executor 310, the front-end processor 320, and/or other or different components). The logic 400 can also detect the momentum of the adaptive clock and work in that direction. Because the adaptive clock depends on the current average workload the storage system 100 has for each command, the more the average workload, the less the clock frequency. As such when having only 4 KB random commands, the command processing path works with full performance with the maximum allowed clock. In this state, the command processing path consumes a lot of power. However, when getting sequential commands, the input clock to the command processing path has a lower frequency since the performance requirement allows it. Using the adaptive clock of these embodiments can reduce power consumption in such a situation, which can be extremely important in storage systems, such as solid state drives (SSDs). More specifically, when the controller 102 does not have a lot of 4 KB random commands, the controller 102 can use the adaptive clock with a lower clock frequency to operate in a low-power mode. As such, using an adaptive clock can increase performance while still meeting performance requirements.

Figure 5:
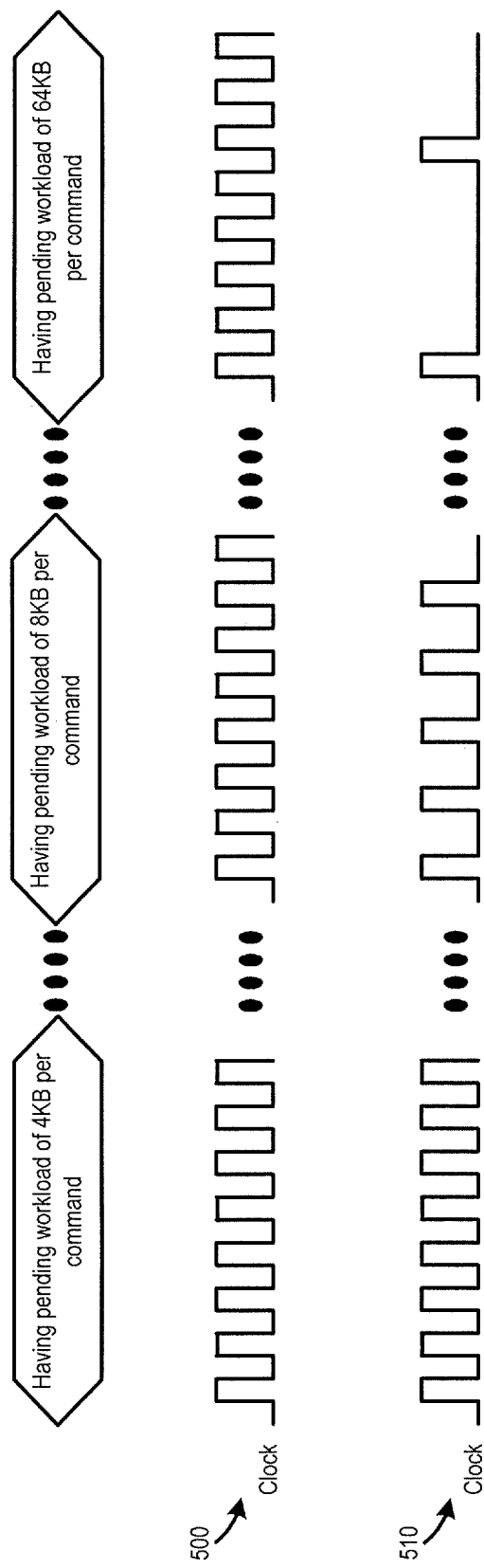
FIG. 5 are illustrations of timing diagrams that illustrate an advantage of using an adaptive clock of an embodiment.

FIG. 5 is an illustration of two timing diagrams 500, 510 that illustrate the advantages of using the adaptive clock. The first timing diagram 500 is of a static clock. As shown in this timing diagram 500, the static clock provides constant 16 clock pulses, even when the pending workload increases from 4 KB per command to 8 KB per command to 64 KB per command. While 16 clock pulses are appropriate for the situation where the pending workload is 4 KB per command, it is not needed in the last two situations where there is more workload per command. As such, the use of a static clock in these last two situations needlessly incurs the power penalty. In contrast, the second timing diagram 510 is of the adaptive clock of these embodiments. As shown in the second timing diagram 510, the adaptive clock also provides 16 clock pulses when the pending workload is 4 KB per command. However, when the workload increases to 8 KB per command, the adaptive clock's frequency drops to 8 clock pulses. Similarly, when the workload increases to 64 KB per command, the adaptive clock's frequency drops to 2 clock pulses. As such, the use of an adaptive clock in these last two situations avoids the needless power penalty incurred by the static clock (i.e., the controller 102 consumes less power when it does not operate in very high frequencies). Again, this is because the adaptive clock has a maximum frequency in this example when having a workload of 4 KB for each pending command. In other scenarios, the frequency of the clock is lower. When having an average workload of 8 KB for each pending command, the frequency of the clock is divided by two. When having an average workload of 64 KB for each pending command, the frequency of the clock is divided by eight.

Figure 6:
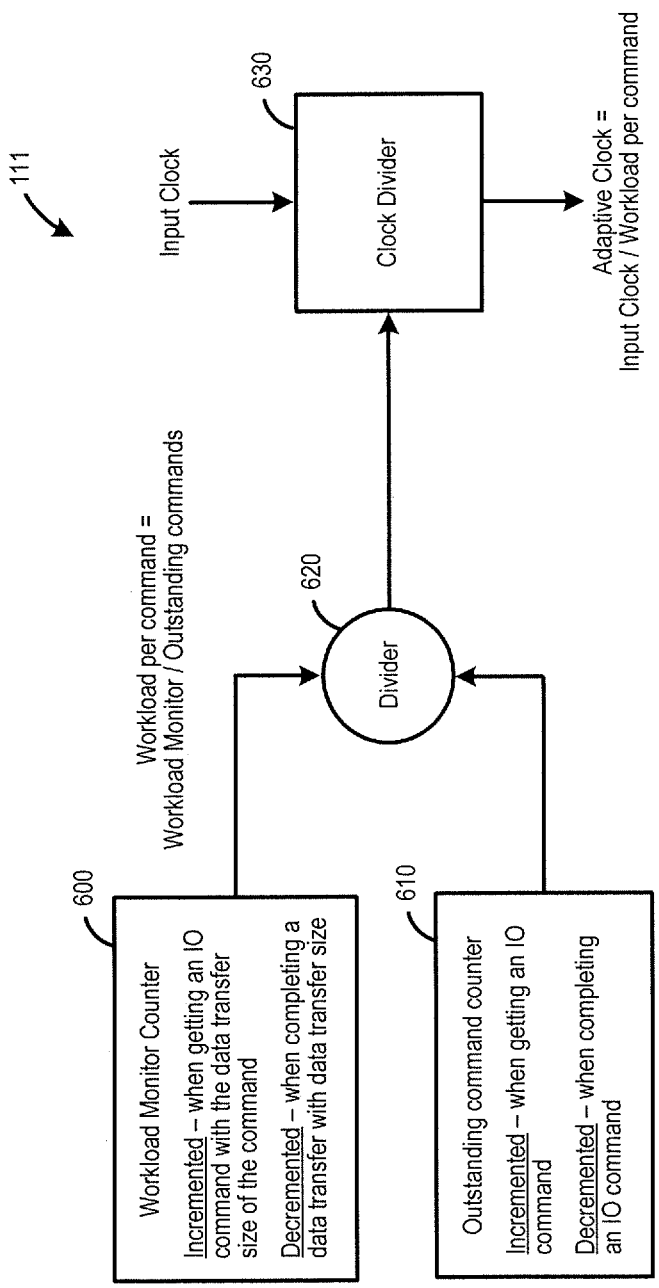
FIG. 6 is an illustration of a workload-based clock generator of an embodiment.

The controller 102 can be configured in any suitable way to generate an adaptive clock. FIG. 6 is one implementation of the workload-based clock generator 111 of an embodiment. It should be understood that this is merely one example and that other implementations can be used. As shown in FIG. 6, in this example, the workload-based clock generator 111 comprises a workload monitor counter 600, an outstanding command counter 610, a divider 620, and a clock divider 630. These components are used in this example to calculate the current average workload per command on the fly at each point, generate the adaptive clock based on that information, and feed the adaptive clock to the command processing path in the controller 102.

More specifically, the outstanding command counter 610 is a counter that holds the current number of outstanding commands for the storage system 100. Its value is incremented whenever getting a new input/output command and decremented whenever completing an input/output command. The outstanding command counter 610 can receive the current number of outstanding commands from the command parser 300. For example, if commands are stored in a queue in the controller 102, the command parser 300 can know the number of commands held in a local queue and inform the workload-based clock generator 111, which can increment the outstanding command counter 610. As another example, when the NVMe protocol is used and commands are stored in the host 50, the host 50 can notify the controller 102 that there are pending commands, and the controller 102 can fetch them from the host 50. Based on this notification from the host 50, the command parser 300 or other component in the controller 102 can inform the workload-based clock generator 111, which can increment the outstanding command counter 610.

The workload monitor counter 600 in this embodiment monitors the pending workload in the storage system 100. The counter value is updated whenever the controller 102 gets a new command based on the size of the command. As used herein, the "size of the command" can refer to the size of the data packet associated with command. The value is also updated whenever completing a data transfer based on the transfer size. In this example, the workload monitor counter 600 works in 4 KB granularity, although other configurations can be used. The workload monitor counter 600 can be made aware of the pending workload in any suitable way. For example, in one embodiment, the command parser 300 has knowledge of the pending workload through the parsing process and can increase both the outstanding command counter 610 and the workload monitor counter 600. The workload monitor counter 600 can also be made aware of the data transfer size (to decrement the counter) in any suitable way. For example, in one embodiment, the scheduler 126 is responsible for informing the workload monitor counter 600 of the data transfer size, as it knows when a command is completed and what the data size was of the completed command.

The divider 630 calculates an average workload per command by dividing the current workload by the number of outstanding commands. This quotient is provided to the clock divider 630 along with the input clock. (The input clock is the static clock that is normally generated by the controller 102. The input clock can be a component in the workload-based clock generator 111 or external to the workload-based clock generator 111.) The clock divider 630 divides the input clock by the average workload per command, and the result is the adaptive clock, which is provided to one or more components in the controller 102 (e.g., the command parser 300, the command executer 310, the front-end processor 320, and/or other components in the controller 102).

There are several advantages associated with these embodiments. For example, by generating an adaptive clock based on the current average workload per command and feeding the adaptive clock to the command processing paths, these embodiments provide the ability to adapt the trade-off between performance and power consumption in real time. Prior storage systems use the worst-case workload scenario to determine the clock frequency of this path, which has a direct correlation to the power consumption. In contrast, these embodiments can use the worst-case circumstances only when required, while working in low-power modes when full performance is not required at a specific point. For example, the command processing path can work in full performance when having a batch of 4 KB random commands and with lower performance in other scenarios). This provides an advantage in terms of power consumption, as the command processing path is an excessive power consumer path. Using these embodiments, this path can work in full performance and in full power mode only when having a full batch of 4 KB random commands. Otherwise, the path can work in a low power mode while having a lower frequency of the input clock (e.g., when having 4 KB random commands, the controller 102 can use a high-frequency while clock, but when having sequential workload, the controller 102 can use a lower-frequency clock). This can be especially important in the SSD market, where power consumption when having full performance is an important factor and/or when using a full performance protocol, such as NVMe, which consumes more power. However, it should be noted that these embodiments can be used in any suitable type of storage system using any suitable type of protocol.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially Banned over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system, comprising:
a memory;
a command processing path; and
a controller for communication with the memory and the command processing path, wherein the controller is configured to:
adapt an input clock signal based on a workload of the controller, wherein when the workload of the controller increases, the controller is configured to adapt the input clock signal by decreasing a rate of the input clock signal; and
provide the adapted input clock signal to the command processing path in the controller,
wherein the workload is based on a size of one or more data packets associated with one or more commands, and
wherein when the size of one or more data packets increases, the controller is configured to adapt the input clock signal by decreasing the rate of the input clock signal.

2. The storage system of claim 1, wherein the controller comprises:
a workload monitor counter;
an outstanding command counter; and
at least one divider configured to adapt the input clock signal by dividing the input clock signal by a quotient of a value of the workload monitor counter divided by a value of the outstanding command counter.

3. The storage system of claim 1, wherein the command processing path comprises one or more of a command parser, a command executor, or a front-end processor.

4. The storage system of claim 1, wherein the memory comprises a three-dimensional memory, and wherein the storage system is embedded in a host.

5. The storage system of claim 1, wherein the storage system is removably connected to a host.

6. A method for using a storage system with an adaptive clock, the method comprising:
performing the following in a storage system comprising a memory and a controller:
calculating an average workload per command;
modifying a clock signal based on the calculated average workload per command, wherein when the calculated average workload per command increases, a frequency of the clock signal is decreased; and
providing the modified clock signal to at least one component in the controller,
wherein the calculated average workload is based on a size of one or more data packets associated with one or more commands, and
wherein when the size of one or more data packets increases, the frequency of the clock signal is decreased.

7. The method of claim 6, wherein the average workload per command is calculated using a first counter that tracks data transfer sizes of pending commands, a second counter that tracks a number of pending commands, and a divider that divides a value of the first counter by a value of the second counter.

8. The method of claim 6, wherein the clock signal is modified by dividing the clock signal by the calculated average workload per command.

9. The method of claim 6, wherein the clock signal is modified using a workload-based clock generator in the controller.

10. The method of claim 6, wherein the at least one component in the controller comprises a command processing component, and wherein the storage system comprises a solid state drive.

11. The method of claim 10, wherein the solid state drive comprises an enterprise solid state drive.

12. A storage system, comprising:
a memory; and
means for generating, using a controller of the storage system, a variable clock signal based on a number of commands and a data transfer size associated with the commands and for providing the variable clock signal to a command processing component,
wherein the means for generating, using the controller of the storage system, the variable clock signal comprises means for increasing a rate of the variable clock signal when a ratio of the data transfer size to the number of commands decreases,
wherein the data transfer size associated with the commands is based on a size of one or more data packets associated with the commands, and
wherein the means for generating, using the controller of the storage system, the variable clock signal comprises means for decreasing the rate of the variable clock signal when the size of one or more data packets increases.

13. The storage system of claim 12, wherein the means for generating comprises at least one counter and at least one divider.

14. The storage system of claim 12, wherein the command processing component comprises one or more of a command parser, a command executor, or a front-end processor.

15. The storage system of claim 12, wherein the memory comprises a three- dimensional memory.

16. The storage system of claim 12, wherein the storage system is embedded in a host.

17. The storage system of claim 12, wherein the storage system is removably connected to a host.

18. The storage system of claim 12, wherein the means for generating, using the controller of the storage system, the variable clock signal comprises means for decreasing the variable clock signal when a quotient of the data transfer size divided by the number of commands increases.

* * * * *